Nov. 18, 1958  J. E. ESHBAUGH  2,860,656
TANK VENT STRUCTURES
Filed Sept. 21, 1954
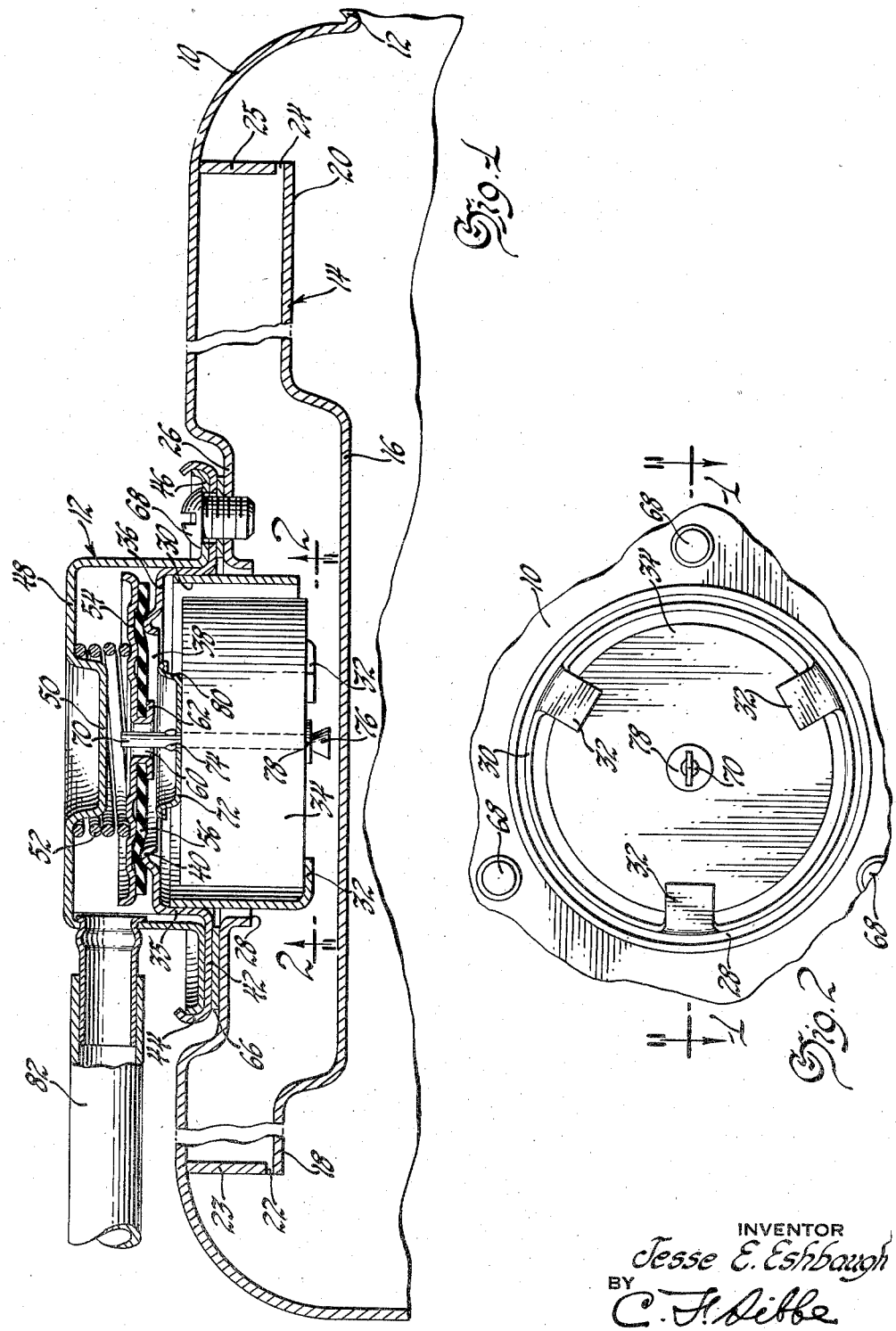
INVENTOR
Jesse E. Eshbaugh
BY
ATTORNEY United States Patent Office 2,860,656
Patented Nov. 18, 1958

2,860,656

TANK VENT STRUCTURES

Jesse E. Eshbaugh, Flint, Mich., assignor to General Motors Corporation, Detroit, Mich., a corporation of Delaware Application September 21, 1954, Serial No. 457,495

2 Claims. (Cl. 137—202)

This invention relates to tanks and more particularly to vent structures as applied to fuel tanks suitable for use on automotive vehicles.

There are some advantages in locating a filler spout for a fuel tank in the rear of a vehicle and it is desirable to make the tank as shallow as possible in view of current efforts to lower the centers of gravity in modern vehicles. This location of the filler spout and the shallow construction of the tank with the latter's conventional baffling are conditions which give rise to a difficulty— the provision of suitable venting for the tank at all times despite an inclination of the tank or rapid acceleration or deceleration of the vehicle. Venting should be constant when the fuel is drawn from the tank by a pump so that the fuel supply to the engine carburetor is not interrupted. If the tank is operated under positive pressure conditions or if it is operated under pump suction, means should be provided for releasing excessive pressure of vapor or fluid in the tank if such pressures should arise as such pressures frequently do arise in desert country and have been known to cause rupture of fuel tanks. Another characteristic of the fuel tank structure is necessary and that is that it should prevent the loss of fuel despite suitable venting of vapors.

An object of the present invention is to provide an improved vent structure for a tank which will vent the tank regardless of the angle of inclination the surface of the fluid in the tank may be caused to assume with respect to the top of the tank and regardless of inclination of the top of the tank with respect to the horizontal.

Another object is to provide an improved vent structure in the use of which fluid surges within a tank will not cause loss of fluid despite the relief of excess pressures which may occur.

Another object is to provide a vent structure suitable for a pressure operated fuel system of which a tank to be vented is part.

To these ends, a feature of the present invention is a channel which is vented at an intermediate portion and which extends along the top of a tank and communicates through ancillary vents with opposite interior zones of the latter.

Another feature is a normally horizontal channel associated with the top of a tank and communicating with spaced zones thereof, the channel having means for venting the tank pressure intermediate its length.

These and other important features of the invention will now be described in detail in the specification and then pointed out more particularly in the appended claims.

In the drawings:

Fig. 1 is a sectional elevational view of the top portion of a fuel tank employing a vent structure in which the present invention is embodied; and Fig. 2 is a view of the vent structure of Fig. 1 looking in the direction of the arrows 2—2.

In the drawings Fig. 1 shows the top portion of a tank 10, the latter being adapted to be mounted at the rear end of a vehicle. The arrangement is such that a filler spout 12 is connected to the rear side of the tank and is adapted to protrude upwardly from the rear of the vehicle. A channel 14 is formed integral with the tank and conveniently may be made to depend from the upper wall of the tank to constitute an interior fixture of the tank. The tank is baffled to prevent undue movement of the fuel therein, but such baffles are not shown in the drawing as they are conventional and are not part of the present invention.

The channel 14 is of elongated form extending towards the front and rear ends of the tank or vehicle in which the tank is installed and is provided with an enlarged portion 16 and two reduced end portions 18 and 20. The ends of the channel are provided with small openings or ancillary vents 22 and 24 and thereby communicate with opposite zones within the tank interior. These openings are formed in the lower margins of plates 23 and 25 which form end walls of the channel.

The upper wall of the tank 10 is recessed as at 26 and has a flanged opening 28 in which is mounted a sleeve 30. The bottom of this sleeve has three inwardly extending and spaced tabs 32 for retaining a cylindrical float 34. The float is so proportioned with respect to the sleeve 30 that it is free to move in a vertical direction for a limited distance. The upper marginal portion of the sleeve 30 is welded to a cylindrical shoulder portion 35 formed on a disc 36. The latter has a large opening 38 defined by an upwardly extending annular ridge or valve seat 40. The disc 36 also has an outwardly extending flange 42 which has a rolled edge 44. This edge is utilized to retain a flange 46 of a housing 48. The top wall of the housing 48 is centrally depressed as at 50 to provide a centering and seating means for a coil spring 52 placed in the housing. This spring is so placed as to act downwardly against an annular disc 54 to which a sealing disc or gasket 56 is attached. This sealing disc is of such size as to overlap the seat 40 and cooperate therewith to form a valve or closure.

The center of the disc 54 is apertured as at 60 and is provided with an outwardly directed flange 62 which serves to hold the sealing disc 56 in assembled relation with the disc 54.

A sealing washer 66 is interposed between the flange 42 and the upper surface of the recessed top wall portion 26 of the tank and three screws 68 are employed to hold the housing 48 to the tank.

A pin 70 passes through the float 34 and a valve disc 72 and one end extends through the vent opening 60. The pin is upset at 74 and 76 and is provided with a washer 78 by means of which it is held in rigid relation with respect to the float.

It will be noted that the pin 70 constitutes a means whereby the effective area of the opening 60 may be determined.

The valve disc 72 bears an upwardly extending and annular valve seat or flange 80 which is adapted to contact the underside of the sealing disc 56 upon rising of the float 34 as will hereinafter be described.

In operation of a vehicle upon which the tank and venting structure have been installed, the channel 14 is normally horizontal or substantially horizontal and venting of the tank occurs through the passage formed between the spaces defined by the fingers 32 and the calibrated outlet 60 which leads to a vent conduit 82 leading to some convenient spot beyond the contour of the tank. During normal operation or conditions, the parts will be positioned as shown in Fig. 1 and air is permitted to enter the tank through the main vent 60 and both ancillary vents 22 and 24 without interfering with the flow of fuel to the pump and carburetor of the engine.

When the vehicle goes up or down a hill or undergoes a quick change in acceleration or deceleration, vent 22 or 24 will always act as a vent passage leading to the upper or liquid free zone of the tank and there will be no interference with the fuel flow to the pump.

If the tank 10 is full or almost full of fuel, surges of the liquid may occur in the channel 14 but because of the presence of the float 34 and the valve disc 72, the main vent 60 will be closed and will check any otherwise possible loss of the fluid.

If, due to hot weather or other conditions bringing about an undesirable increased pressure in the tank 10, then the spring 52 will yield and the valve disc 56 will rise clear of the valve seat 40 and cause excess pressure to be vented to the line 82. It will be appreciated that the action of the float 34 in closing the port 60 will be resilient when the fluid conditions in the tank are such as to bring closure about.

The central portion of the channel 14 will retain some fluid if the fluid level attains the proper height. This is of no moment as the proportions and weight of the float 34 are such that the float will not rise at that fluid level as retained. A surge of fluid above that retained level will raise the float and close the main vent 60.

Ancillary vents 22 and 24 are small to restrict liquid flow and yet not adversely effect venting so that when liquid fills the forward or rearward end of the tank, the fluid will not quickly attain the same level inside the channel 14 as it does on the outside. Eventually, of course, the same level will be attained if the tank's position with relation to the horizontal is not altered. In the meanwhile, however, if vent 24 is covered with fluid, the vent 22 will serve as an air vent for a substantial interim of time and will admit air from the main vent 60 to the liquid-clear zone of the tank. If vent 22 is covered, then vent 24 will serve to admit air. A vent for air need not be as large as a vent for liquid because of the difference in rates of flow of air and liquid through a restricted orifice.

I claim:

1. A tank vent structure including a tank, a channel with imperforate sides and bottom extending along the top of said tank and having small ancillary vents communicating with opposite interior zones of the latter, said tank having a filler tube communicating directly with one of said zones, a vent structure provided with two concentric vent openings leading from the ambient atmosphere to an intermediate portion of said channel, a large valve arranged to control one of said openings and urged towards the interior of said tank and into closed position by means of a spring, a small valve arranged to close the other of said vent openings, a float mounted in said channel and connected to the latter valve for closing the associated vent opening when the tank is full of liquid.

2. A tank vent structure including a tank, a longitudinal channel with imperforate sides and bottom extending along the top of said tank and communicating at its ends through restricted ancillary vents with opposite interior zones of the tank, a vent structure comprising two concentric vent openings communicating with an intermediate portion of said channel, valves controlling said vent openings, one of said valves being urged downwardly into closed position by means of a spring, another of said valves being urged upwardly into a closed position by means of a float arranged in said channel, and each of said vent openings being in effective communication with the ambient atmosphere when the corresponding valve is opened as a result of predetermined pressure conditions.

References Cited in the file of this patent

UNITED STATES PATENTS

| | | |
|---|---|---|
| 1,559,207 | Van Ringelenstein | Oct. 27, 1925 |
| 1,678,516 | Suengst | July 24, 1928 |
| 1,758,671 | Loughead | May 13, 1930 |
| 1,806,292 | Hunt | May 19, 1931 |
| 1,999,336 | McGillicuddy | Apr. 30, 1935 |
| 2,171,168 | Swank | Aug. 29, 1939 |
| 2,273,737 | Snyder | Feb. 17, 1942 |
| 2,404,765 | Valentine | July 23, 1946 |